(12) United States Patent
Charraud et al.

(10) Patent No.: US 12,533,647 B2
(45) Date of Patent: Jan. 27, 2026

(54) TECHNIQUES FOR IMPROVING ACCURACY OF SHARED CUSTOM COLOR REPRODUCTION OF COSMETIC PRODUCTS

(71) Applicant: L'Oreal, Paris (FR)

(72) Inventors: Gregoire Charraud, Jersey City, NJ (US); Emma Palomba, Paris (FR); Guive Balooch, Paris (FR)

(73) Assignee: L'Oreal, Paris (FR)

( * ) Notice: Subject to any disclaimer, the term of this patent is extended or adjusted under 35 U.S.C. 154(b) by 864 days.

(21) Appl. No.: 17/828,889

(22) Filed: May 31, 2022

(65) Prior Publication Data

US 2023/0381724 A1  Nov. 30, 2023

(51) Int. Cl.
*B01F 33/84* (2022.01)
*B01F 101/21* (2022.01)

(52) U.S. Cl.
CPC ........ *B01F 33/846* (2022.01); *B01F 2101/21* (2022.01)

(58) Field of Classification Search
CPC ............... B01F 33/846; B01F 33/8442; A45D 2200/058; A45D 44/005
See application file for complete search history.

(56) References Cited

U.S. PATENT DOCUMENTS

| | | | | |
|---|---|---|---|---|
| 11,615,666 | B1 * | 3/2023 | Hoshino | G07F 11/64 700/233 |
| 12,257,064 | B2 | 3/2025 | Tendulkar et al. | |
| 12,300,371 | B1 | 5/2025 | Dods et al. | |
| 2003/0062385 | A1 * | 4/2003 | Engel | A45D 34/04 222/145.8 |

(Continued)

FOREIGN PATENT DOCUMENTS

FR  3106735 A1  8/2021

OTHER PUBLICATIONS

Search Report and Written Opinion mailed Mar. 3, 2023, issued in corresponding French Application No. 2208060 (French version), filed Aug. 3, 2022, 9 pages.
"Social Media", Wikipedia, https://en.wikipedia.org/w/index.php?title=Social_networking_service&oldid=1099839621, Jul. 31, 2022, 63 pages.
"Social networking service" Wikipedia, https://en.wikipedia.org/w/index.php?title=Social_media&oldid=1101581443, Jul. 31, 2022, 35 pages.

(Continued)

*Primary Examiner* — Timothy R Waggoner
(74) *Attorney, Agent, or Firm* — Christensen O'Connor Johnson Kindness PLLC

(57) ABSTRACT

In some embodiments, a system is provided. The system comprises a plurality of product mixing devices; a color communication computing system; and a mobile computing device. The mobile computing device is communicatively coupled to a first product mixing device of the plurality of product mixing devices and communicatively coupled to the color communication computing system. The mobile computing device includes a non-transitory computer-readable medium having computer-executable instructions stored thereon that, in response to execution by at least one processor of the mobile computing device, cause the mobile computing device to perform actions comprising: receiving a message from the color communication computing system indicating a product having a first color that was dispensed by a second product mixing device of the plurality of product mixing devices; and causing, by the mobile computing device, the first color to be presented.

20 Claims, 15 Drawing Sheets

(56) References Cited

U.S. PATENT DOCUMENTS

| | | |
|---|---|---|
| 2012/0123588 A1 | 5/2012 | Cloran et al. |
| 2012/0156337 A1 | 6/2012 | Studor et al. |
| 2017/0208920 A1* | 7/2017 | Thiebaut ............... B01F 33/841 |
| 2017/0238753 A1 | 8/2017 | Merali et al. |
| 2018/0072555 A1* | 3/2018 | Fortunato .......... G06Q 20/3274 |
| 2018/0357695 A1* | 12/2018 | Wolff ................... A45D 44/005 |
| 2021/0236863 A1 | 8/2021 | Suwanto et al. |
| 2025/0148777 A1 | 5/2025 | Tsai et al. |

OTHER PUBLICATIONS

Notice of Allowance mailed May 24, 2025, issued in U.S. Appl. No. 17/828,917, filed May 31, 2022, 26 pages.

* cited by examiner

TECHNIQUES FOR IMPROVING ACCURACY OF SHARED CUSTOM COLOR REPRODUCTION OF COSMETIC PRODUCTS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system is provided. The system comprises a plurality of product mixing devices; a color communication computing system; and a mobile computing device. The mobile computing device is communicatively coupled to a first product mixing device of the plurality of product mixing devices and communicatively coupled to the color communication computing system. The mobile computing device includes a non-transitory computer-readable medium having computer-executable instructions stored thereon that, in response to execution by at least one processor of the mobile computing device, cause the mobile computing device to perform actions comprising: receiving a message from the color communication computing system indicating a product having a first color that was dispensed by a second product mixing device of the plurality of product mixing devices; and causing, by the mobile computing device, the first color to be presented.

In some embodiments, a method is provided. A mobile computing device that is communicatively coupled to a first product mixing device receives a message from a color communication computing system indicating a product having a first color that was dispensed by a second product mixing device. The mobile computing device causes the first color to be presented.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
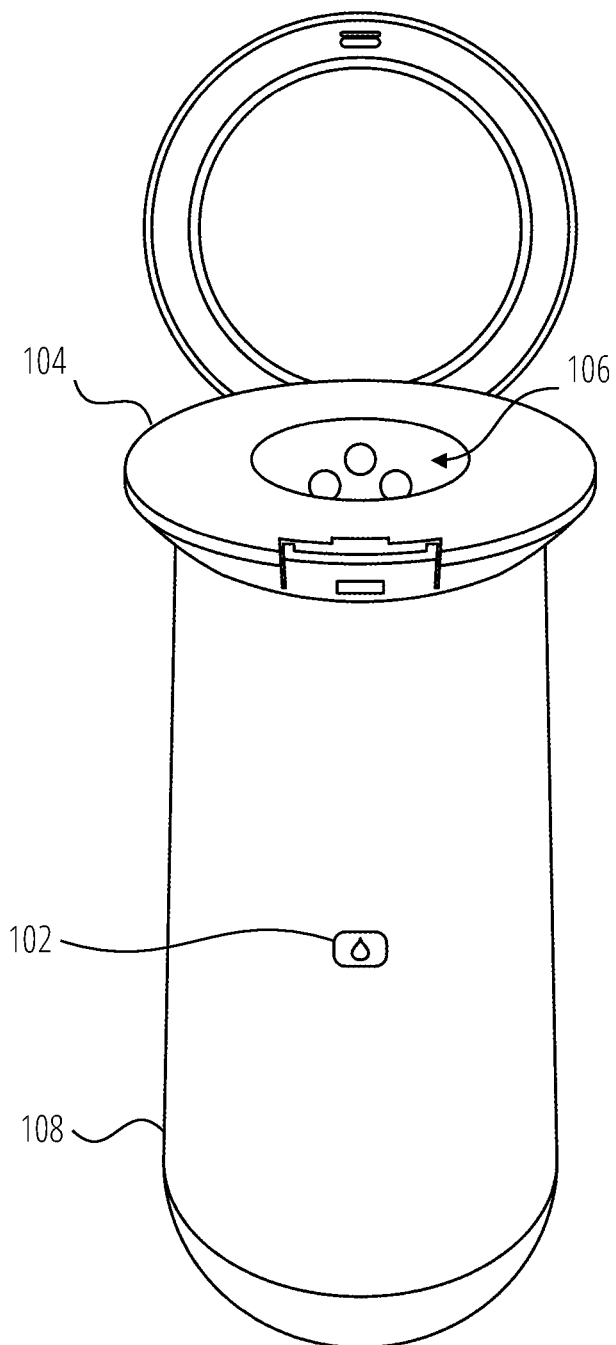
FIG. 1A and FIG. 1B illustrate a non-limiting example embodiment of a product mixing device according to various aspects of the present disclosure.
Figure 1B:
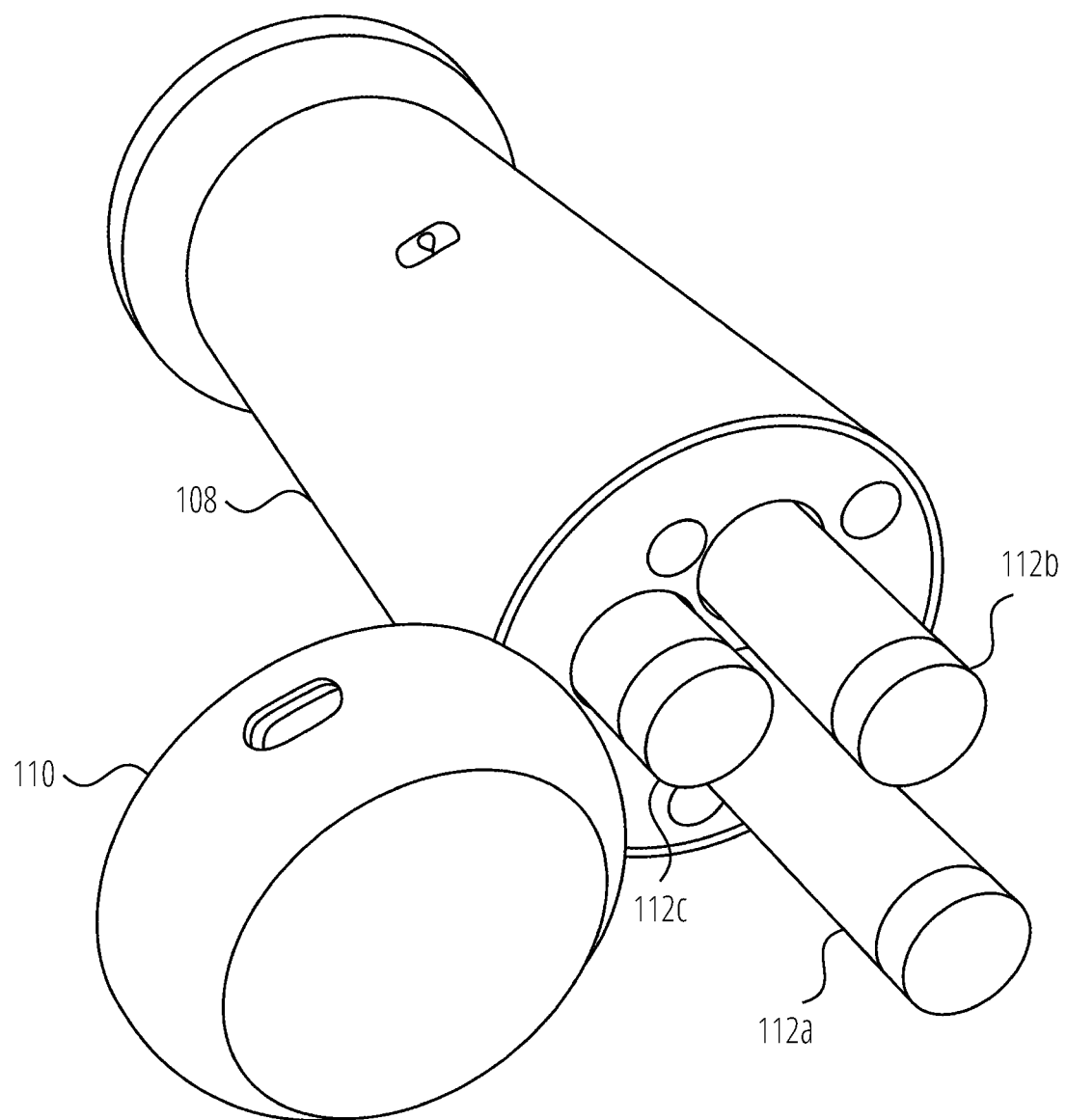

FIG. 1A and FIG. 1B illustrate a non-limiting example embodiment of a product mixing device according to various aspects of the present disclosure. The illustrated product mixing device 108 is a PERSO(™) product mixing machine provided L'Oreal, but other product mixing devices that are capable of performing the actions described herein may be used as a product mixing device 108 in other embodiments of the present disclosure. The product mixing device 108 is configured to dispense products such as cosmetic products including but not limited to lipstick, lip gloss, lip stain, and other cosmetic products having customizable colors.

As shown in the front view of FIG. 1A, the product mixing device 108 includes a button 102. The product mixing device 108 receives an instruction to dispense color component products that, when mixed, provide a mixed product having the desired color. The instruction may be transmitted by a paired device such as a first mobile computing device 204, and may include a recipe or other instructions for amounts of each of the color component products to be dispensed to produce a desired color. Upon receiving such an instruction and a press of the button 102, the product mixing device 108 dispenses the appropriate amounts of each color component product on a mixing surface 104. FIG. 1A shows dispensed color component products 106 on the mixing surface 104. In some embodiments, the user then uses a brush or other mixing implement to combine the dispensed color component products 106 on the mixing surface 104. In some embodiments, the user does not need to press the button 102, and instead the product mixing device 108 receives an instruction to automatically dispense the color component products directly from the first mobile computing device 204.

FIG. 1B illustrates a bottom perspective view of the product mixing device 108 of FIG. 1A. In FIG. 1B, a cover 110 is shown in an open position, in which cartridges 112a-112c are visible in a partially inserted position. Each cartridge 112a-112c includes a color component product that has a predetermined color. The user may exchange one or more of the cartridges 112a-112c to change a spectrum of available colors that the product mixing device 210 can provide. In some embodiments, each cartridge 112a-112c includes a computer-readable identifier (e.g., an RFID tag, a serial number, a 2D- or 3D barcode; not illustrated) that can be read by a reader of the product mixing device 108 and/or a first mobile computing device 204 and/or the color communication computing system 202, as will be described further below.

Users of cosmetic products often wish to receive advice for suggested colors and follow trends of currently popular colors. With the limited numbers of pre-fabricated colors that were previously available (and often marketed using identifiable names), following trends or suggestions was as simple as finding the product with the suggested name. The advent of product mixing devices 108 has allowed users to have access to a large number of different customizable colors for cosmetic products. While this greatly increases the color options available to users, it raises a new problem in that it is no longer simple for a user to receive color suggestions since the customizable colors are not marketed with names or defined for the user with detailed recipe information. Further, differences in lighting, display configurations, and other technical factors make it extremely difficult to communicate a color for a product to be dispensed based on an image or other presentation of the color itself. What is needed are techniques that allow color trends for customized colors to be detected and communicated in a way that the colors can be duplicated by a receiving product mixing device 108.

Figure 2:
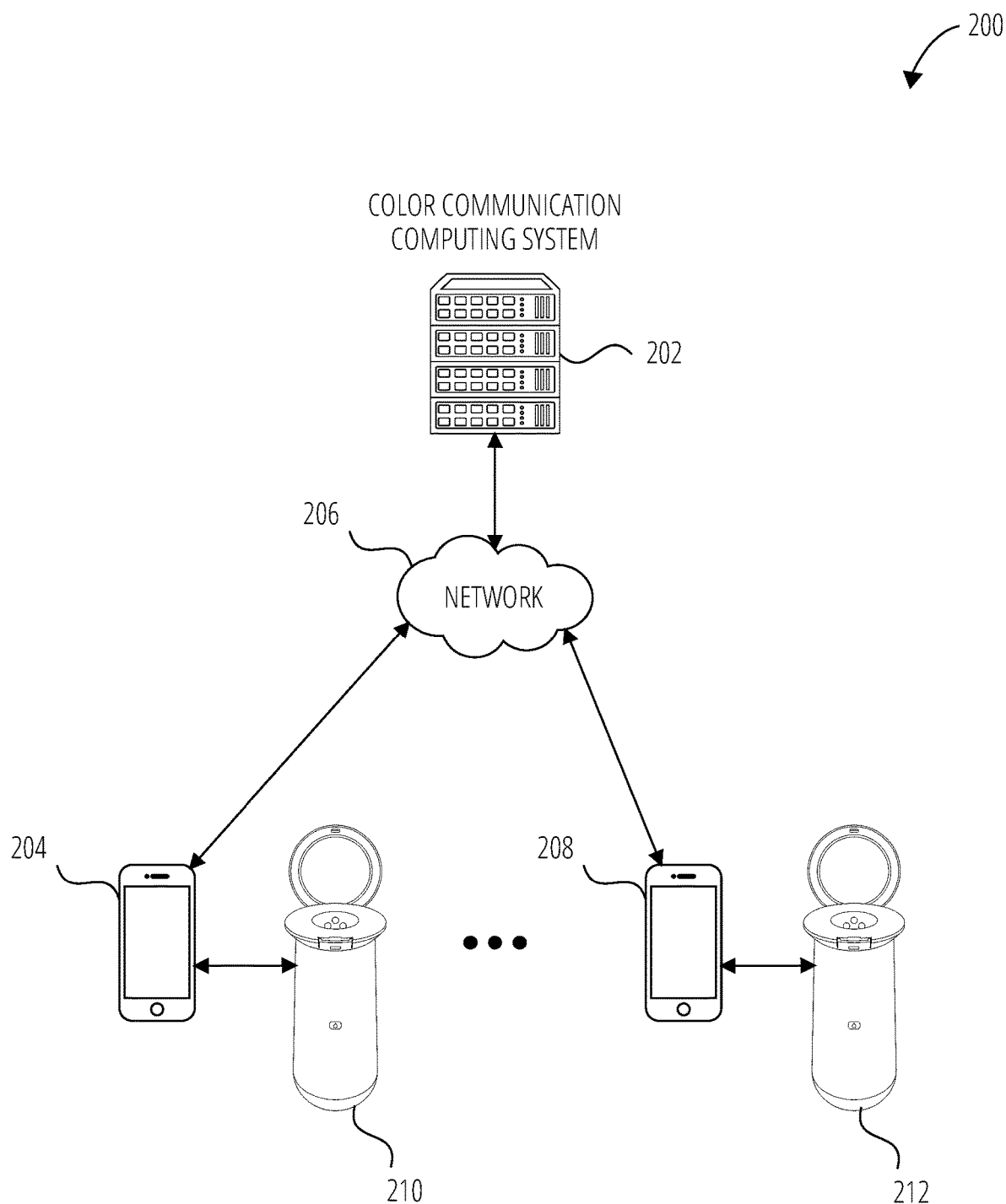
FIG. 2 illustrates a system for communicating customized color information for dispensing customized color products according to various aspects of the present disclosure.

FIG. 2 illustrates a system for communicating customized color information for dispensing customized color products according to various aspects of the present disclosure. The system 200 includes a plurality of mobile computing devices (including a first mobile computing device 204 and a second mobile computing device 208). Each of the mobile computing devices is communicatively coupled (e.g., paired via Bluetooth or any other suitable communication technology) with a corresponding product mixing device. As shown, the first mobile computing device 204 is paired with a first product mixing device 210, and the second mobile computing device 208 is paired with a second product mixing device 212. Though only two sets of mobile computing device/product mixing device pairs are illustrated, one will recognize that many more pairs may be present in the system 200 (including hundreds or thousands of pairs) without departing from the scope of the present disclosure.

As described above, without any additional technical assistance, it would be very difficult for the same customized color to be produced by both the first product mixing device 210 and the second product mixing device 212. Accordingly, the system 200 includes a color communication computing system 202. The first mobile computing device 204 and the second mobile computing device 208 communicate color information with the color communication computing system 202 via a network 206.

For example, the mobile computing devices may transmit color interest messages that indicate a user is interested in a given color. Interest, as described further below, may include a "like" of a displayed color, a "save" of a displayed color, an indication that a color was dispensed by the associated product mixing device, or any other suitable indication of interest in a color. The mobile computing devices may receive color information from the color communication computing system 202, including but not limited to indications of trending colors in which users of other mobile computing devices have indicated interest, and recipes for trending colors, colors associated with presentations, or any other type of color information.

By managing communication of color information, the color communication computing system 202 provides technical benefits over previous techniques. As discussed above, previous techniques made it highly difficult to accurately reproduce customized colors between different product mixing devices. By using the color communication computing system 202 to collect and distribute color information, the system 200 overcomes these technical problems and improves the fidelity of customized color reproduction between separate product mixing devices.

Figure 3:
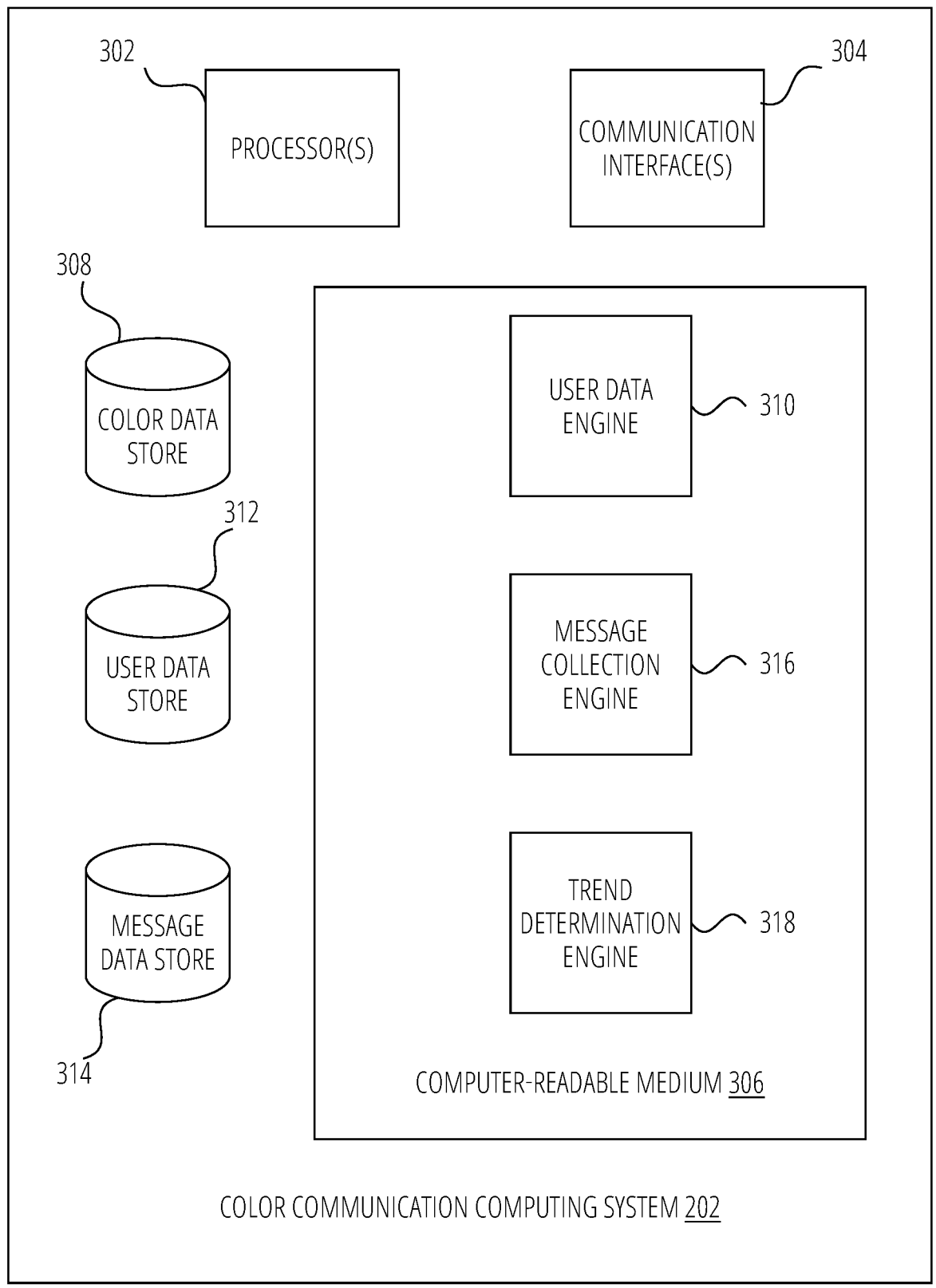
FIG. 3 is a block diagram that illustrates aspects of a non-limiting example embodiment of a color communication computing system according to various aspects of the present disclosure.

FIG. 3 is a block diagram that illustrates aspects of a non-limiting example embodiment of a color communication computing system according to various aspects of the present disclosure. The illustrated color communication computing system 202 may be implemented by any computing device or collection of computing devices, including but not limited to a desktop computing device, a laptop computing device, a mobile computing device, a server computing device, a computing device of a cloud computing system, and/or combinations thereof.

In some embodiments, the color communication computing system 202 is configured to receive messages regarding interest in colors in order to determine trends, and to transmit information about trending colors to users. In some embodiments, the color communication computing system 202 is also configured to transmit recipes for colors selected by users from the trending colors so that the colors may be accurately reproduced by product mixing devices 108. In some embodiments, the color communication computing system 202 is configured to transmit instructions to product mixing devices 108 to automatically dispense products having colors associated with a presentation.

As shown, the color communication computing system 202 includes one or more processors 302, one or more communication interfaces 304, a color data store 308, a user data store 312, a message data store 314, and a computer-readable medium 306.

In some embodiments, the processors 302 may include any suitable type of general-purpose computer processor. In some embodiments, the processors 302 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 304 include one or more hardware and or software interfaces suitable for providing communication links between components. The communication interfaces 304 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 306 has stored thereon logic that, in response to execution by the one or more processors 302, cause the color communication computing system 202 to provide a user data engine 310, a message collection engine 316, and a trend determination engine 318.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the user data engine 310 is configured to store information about users of the system 200 in the user data store 312. This information may include information associated with a given user, including but not limited to login information, saved color information, liked color information, privacy settings, notification settings, contact information (including but not limited to a network address of an associated first mobile computing device 204), profile pictures, color component product information for cartridges installed in an associated product mixing device, and/or any other information associated with the given user. This information may also include information that links users, including other users followed by a given user, and/or other users that follow the given user.

In some embodiments, the message collection engine 316 is configured to receive messages from mobile computing devices and store related information in the message data store 314. In some embodiments, the messages relate to colors of products that have been saved, liked, and/or dispensed by product mixing devices within the system 200. In some embodiments, the trend determination engine 318 is configured to review the information stored in the message data store 314 to determine "trends" (e.g., colors that are more commonly liked, saved, and/or dispensed by users in the system 200 than others).

Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 4:
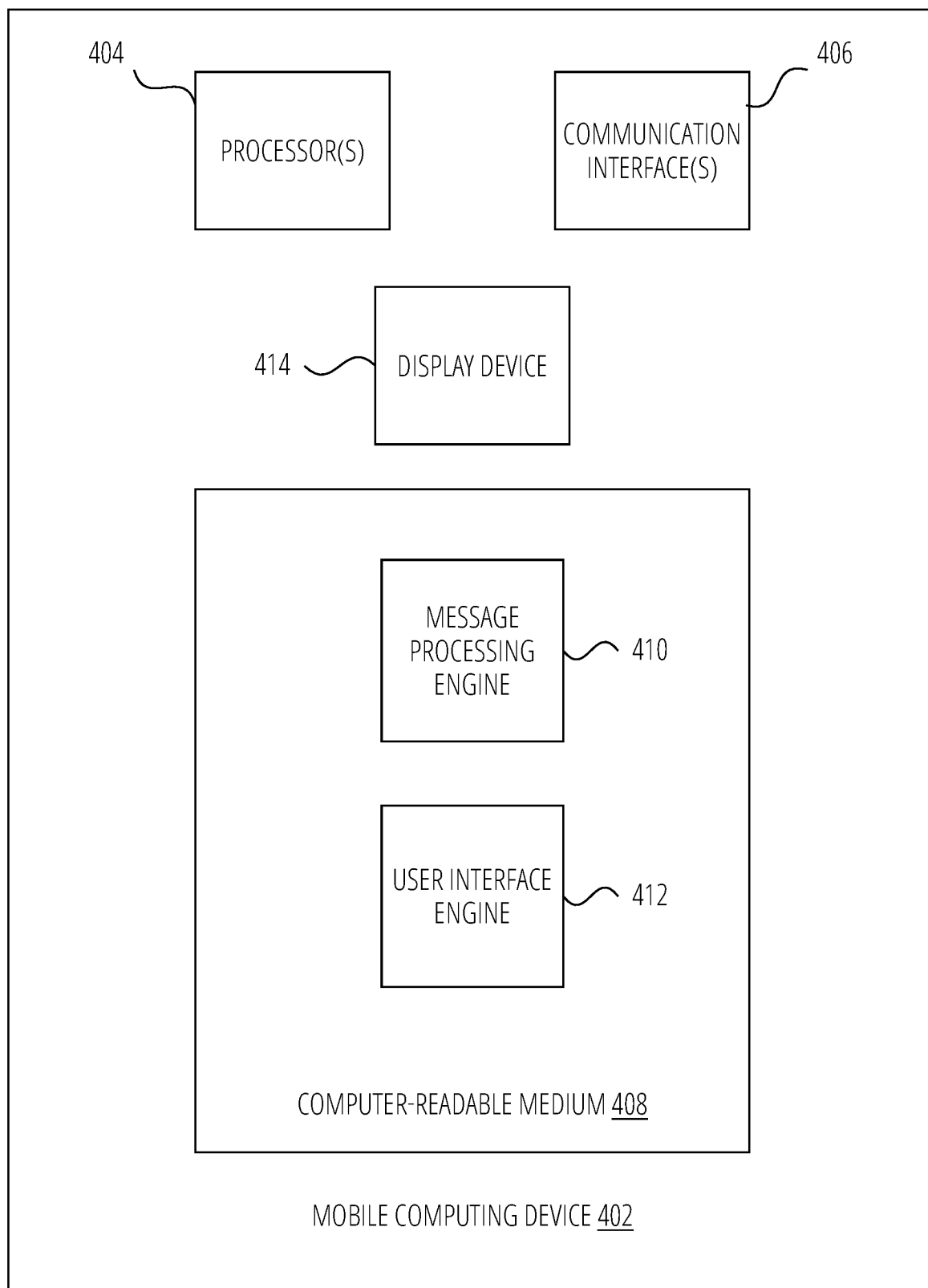
FIG. 4 is a block diagram that illustrates aspects of a non-limiting example embodiment of a mobile computing device according to various aspects of the present disclosure.

FIG. 4 is a block diagram that illustrates aspects of a non-limiting example embodiment of a mobile computing device according to various aspects of the present disclosure. Typically, the mobile computing device 402 may be implemented by a smartphone computing device or a tablet computing device. However, any other type of computing device that can provide the described functionality, including but not limited to a desktop computing device, a laptop computing device, a server computing device, a computing device of a cloud computing system, and/or combinations thereof, may instead be used. The mobile computing device 402 is configured to communicate with a product mixing device 108, including but not limited to communicating instructions for dispensing products to a product mixing device 108, and messages from the product mixing device 108 regarding products that have been dispensed. The mobile computing device 402 is also configured to communicate with the color communication computing system 202 in order to report color interest information and to receive color information (including but not limited to trending color information and/or color information associated with presentations).

As shown, the mobile computing device 402 includes one or more processors 404, one or more communication interfaces 406, a display device 414, and a computer-readable medium 408.

In some embodiments, the processors 404 may include any suitable type of general-purpose computer processor. In some embodiments, the processors 404 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 406 include one or more hardware and or software interfaces suitable for providing communication links between components. The communication interfaces 406 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

In some embodiments, the display device 414 is a LCD display device, an LED display device, an OLED display device, a touchscreen display device, or any other suitable type of display device for use with the first mobile computing device 204 as described below. While a "display device" for visual presentations is primarily discussed herein, this should not be seen as limiting. In some embodiments, the display device 414 may include other technologies for presenting information, including but not limited to loudspeakers for presenting audio information and haptic devices for presenting tactile information.

As shown, the computer-readable medium 408 has stored thereon logic that, in response to execution by the one or more processors 404, cause the mobile computing device 402 to provide a message processing engine 410 and a user interface engine 412.

In some embodiments, the message processing engine 410 is configured to receive messages from an associated product mixing device including information regarding dispensed products and/or color component products in cartridges installed in the product mixing device, and to report the information to the color communication computing system 202. In some embodiments, the message processing engine 410 is also configured to receive messages from the color communication computing system 202 and to take appropriate action, including but not limited to causing a product having a specified color to be automatically dispensed by the product mixing device, presenting a notification regarding a specified color, and/or other actions. In some embodiments, the user interface engine 412 is configured to present user interfaces using the display device 414, including but not limited to user interfaces for presenting trends, user interfaces for controlling connections between an associated user and other users, and user interfaces for presenting notifications associated with messages received from the color communication computing system 202.

Further description of the configuration of each of these components is provided below.

Figure 5A:
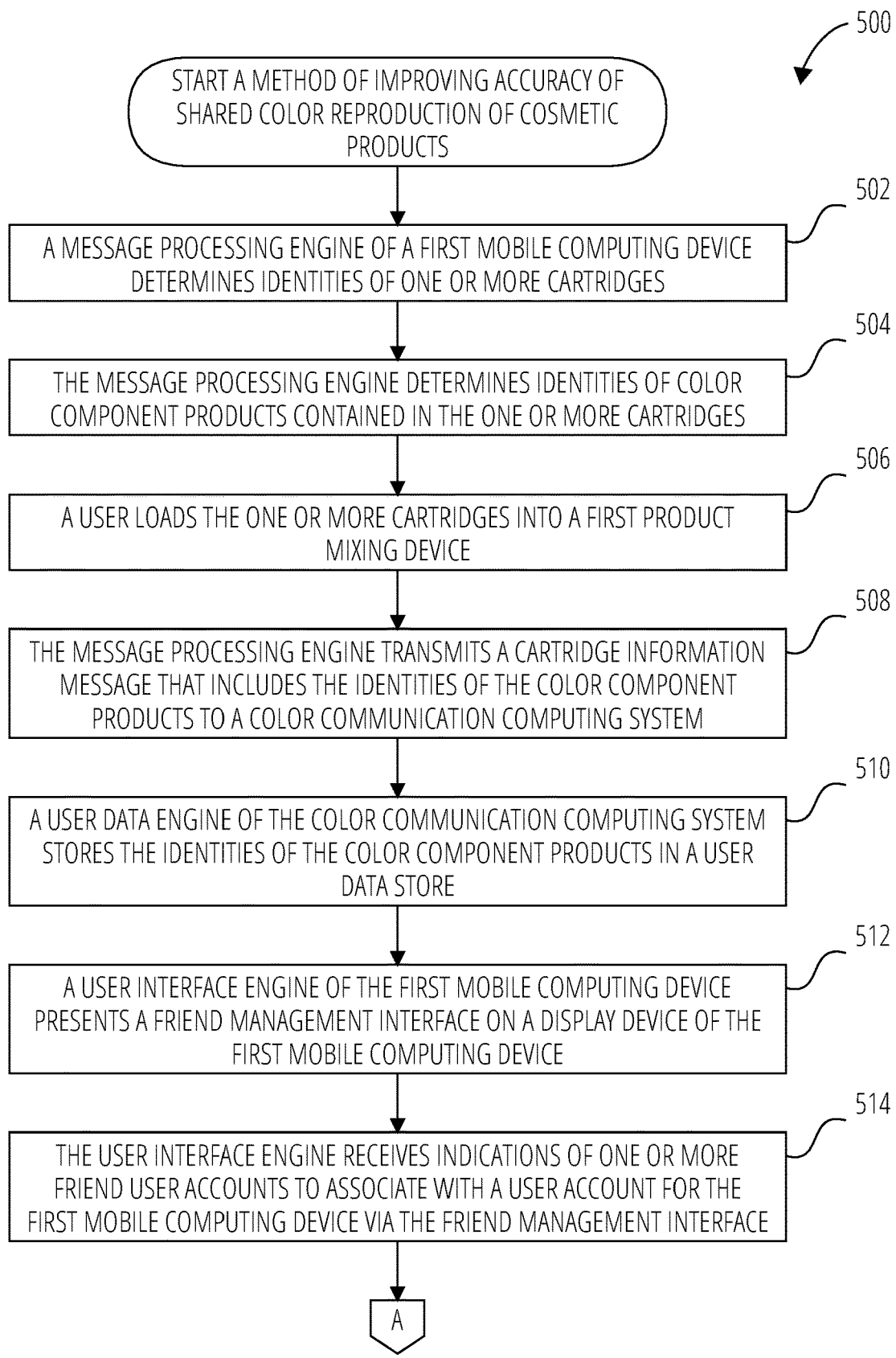
FIG. 5A-FIG. 5C are a flowchart that illustrates a non-limiting example embodiment of a method of improving accuracy of shared color reproduction of cosmetic products according to various aspects of the present disclosure.
Figure 5B:
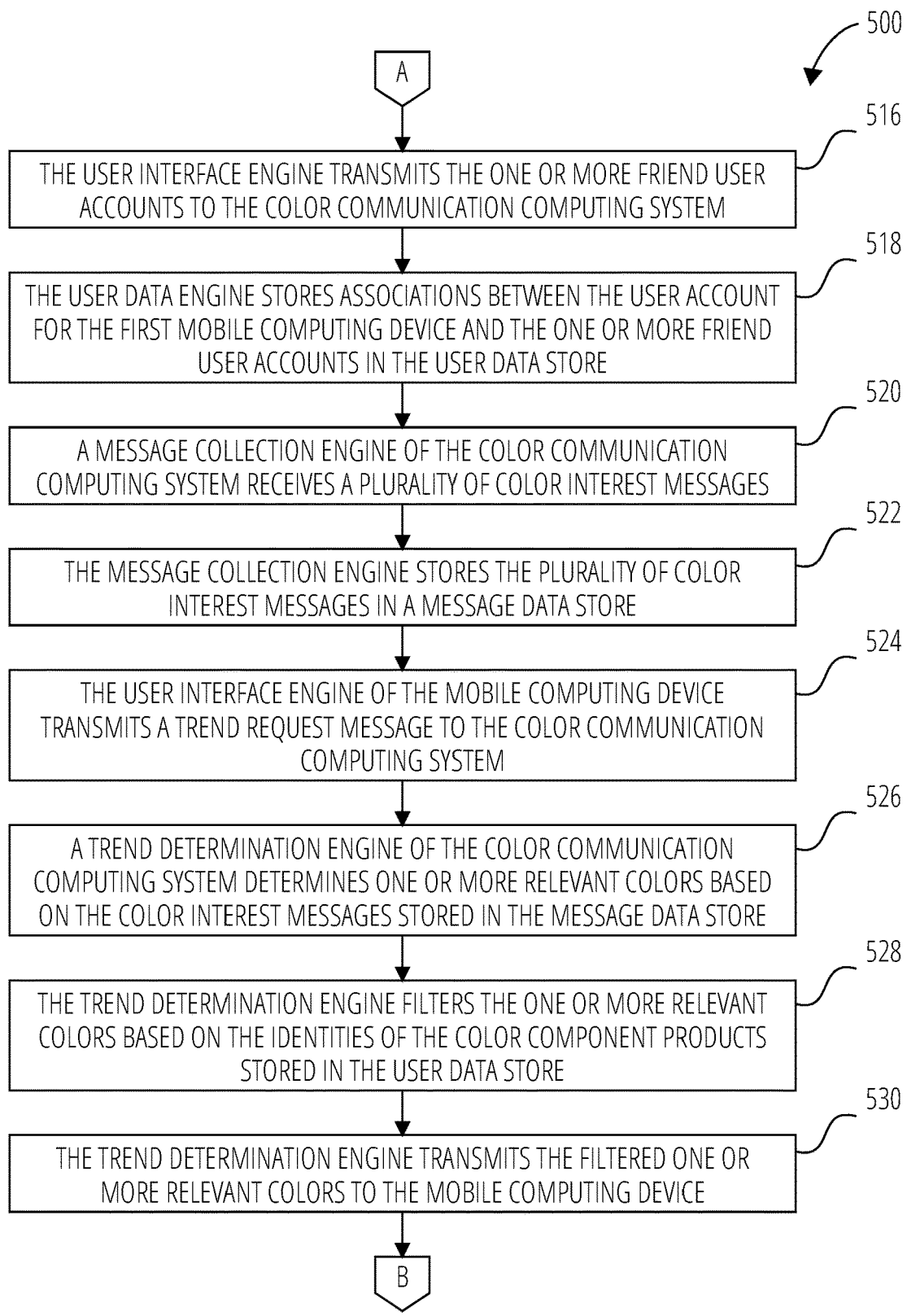
Figure 5C:
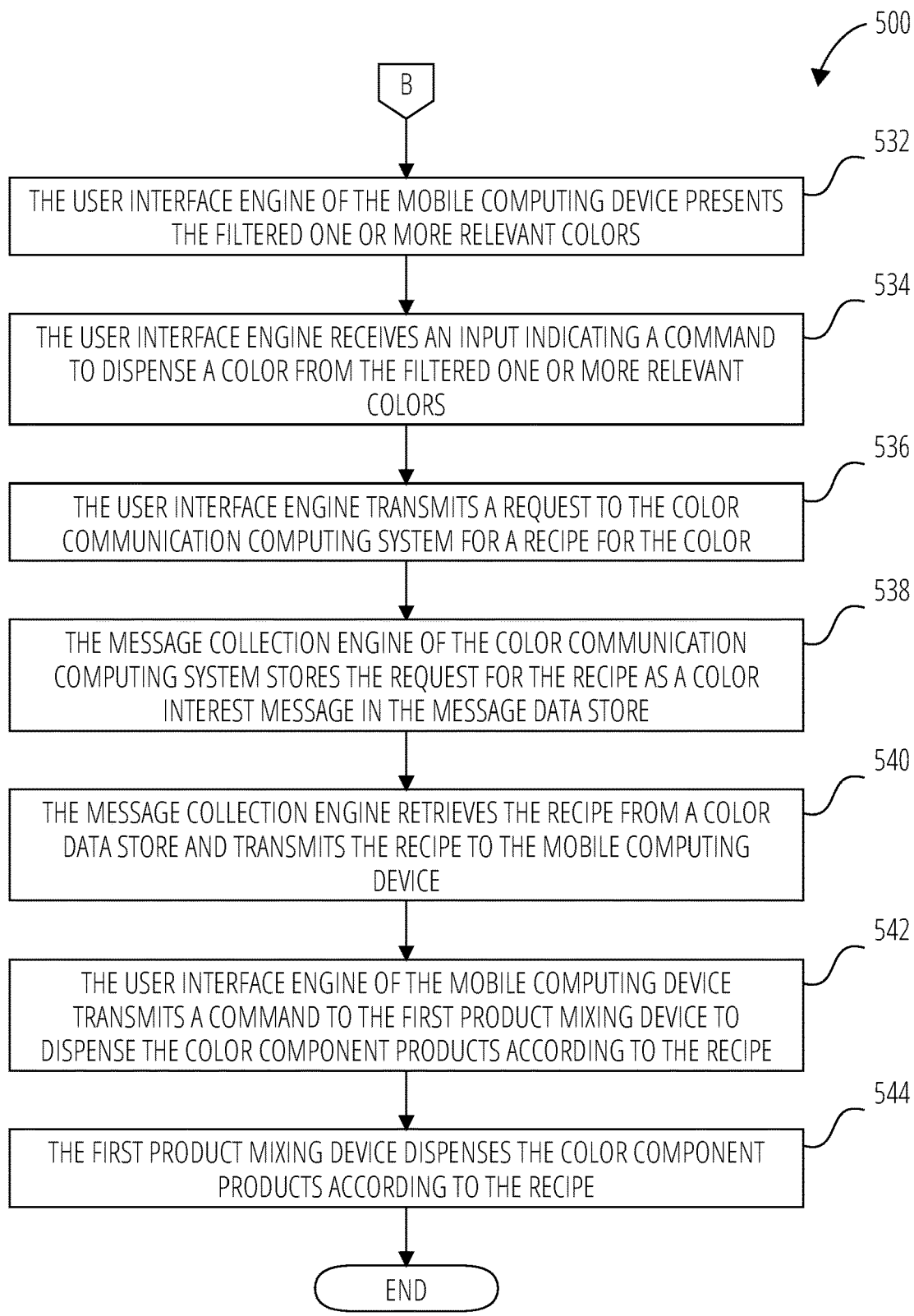

FIG. 5A-FIG. 5C are a flowchart that illustrates a non-limiting example embodiment of a method of improving accuracy of shared color reproduction of cosmetic products according to various aspects of the present disclosure. In the method 500, relevant colors are determined by the color communication computing system 202 (e.g., trending colors amongst all users of the system 200, colors dispensed by friend user accounts, colors trending amongst friend user accounts, etc.), and are communicated to mobile computing devices so that the colors may be accurately reproduced using associated product mixing devices.

From a start block, the method 500 proceeds to block 502, where a message processing engine 410 of a first mobile computing device 204 determines identities of one or more cartridges. In some embodiments, an RFID reader of the first mobile computing device 204 may interrogate an RFID tag of each cartridge to obtain a unique identifier of each cartridge. In some embodiments, the first mobile computing device 204 may use a camera to capture an image of a barcode, QR code, or other indicator on each cartridge that encodes a unique identifier of each cartridge. In some embodiments, the first product mixing device 210 may obtain the unique identifier of each cartridge (such as by interrogating an RFID tag of each cartridge or via wired communication with each installed cartridge), and the first product mixing device 210 may transmit the unique identifiers to the first mobile computing device 204.

At block 504, the message processing engine 410 determines identities of color component products contained in the one or more cartridges. In some embodiments, a record is stored by the color communication computing system 202 in a color data store 308 for every cartridge (including but not limited to cartridges 112a-112c) that associates the unique identifier of the cartridge with an identity of a color component product contained therein.

At block 506, a user loads the one or more cartridges into a first product mixing device 210. As illustrated in FIG. 1B, the user may open a cover on the first product mixing device 210 and insert the one or more cartridges into the first product mixing device 210 for use.

At block 508, the message processing engine 410 transmits a cartridge information message that includes the identities of the color component products to a color communication computing system 202, and at block 510, a user data engine 310 of the color communication computing system 202 stores the identities of the color component products in a user data store 312. The user data engine 310 may store the identities of the color component products in a user record for a user associated with the first mobile computing device 204.

Along with the identities of the color component products, the user record may store any other relevant information associated with the user associated with the first mobile computing device 204. For example, the user record may store a first name and last name, a user name, contact information including but not limited to an email address and/or a telephone number, an identifier of the first mobile computing device 204, an identifier of the first product mixing device 210, a profile picture of the user, and/or activity information for the user. The activity information may include but is not limited to information related to colors dispensed by the first product mixing device 210 (including one or more of a timestamp of the dispensing, an identifier of a recipe for the colors dispensed, and identities of the color component products used to dispense the colors), and information related to colors liked or saved by the user via a user interface generated by the user interface engine 412 (including one or more of a timestamp of the like/save, and an identifier of a recipe for the colors liked/saved).

At block 512, a user interface engine 412 of the first mobile computing device 204 presents a friend management interface on a display device 414 of the first mobile computing device 204, and at block 514, the user interface engine 412 receives indications of one or more friend user accounts to associate with a user account for the first mobile computing device 204 via the friend management interface. Any suitable user interface may be used for friend management, which may include searching for potential friend user accounts, and adding and/or removing friend user accounts to be followed by the user account for the first mobile computing device 204.

The friend management interface may also be usable to change privacy settings for the user account for the first mobile computing device 204, such as changing between a private and a public mode, and/or specifying what types of stored information are made available to friend user accounts that follow the user account for the first mobile computing device 204. While in a public mode, one or more features may be enabled, including but not limited to searching for the user account via a search interface, sharing colors saved in association with the user account with other user accounts, sharing activity (e.g., colors dispensed, liked, and/or saved) by the user account with other user accounts, and reporting activity (e.g., colors dispensed, liked, and/or saved) to the color communication computing system 202 for aggregation with activity associated with other user accounts to determine trends. While in a private mode, one or more of the above features may be disabled, including but not limited to hiding the user account and/or associated activity from other user accounts unless mutual consent is obtained. In some embodiments, the friend management interface may allow individual features to be placed into either public or private mode.

The method 500 then proceeds to a continuation terminal ("terminal A"). From terminal A (FIG. 5B), the method 500 proceeds to block 516, where the user interface engine 412 transmits the one or more friend user accounts to the color communication computing system 202. At block 518, the user data engine 310 stores associations between the user account for the first mobile computing device 204 and the one or more friend user accounts in the user data store 312. In some embodiments, the associations are stored in the user record for the user account for the first mobile computing device 204. In some embodiments, separate records are stored for the associations.

Figure 6:
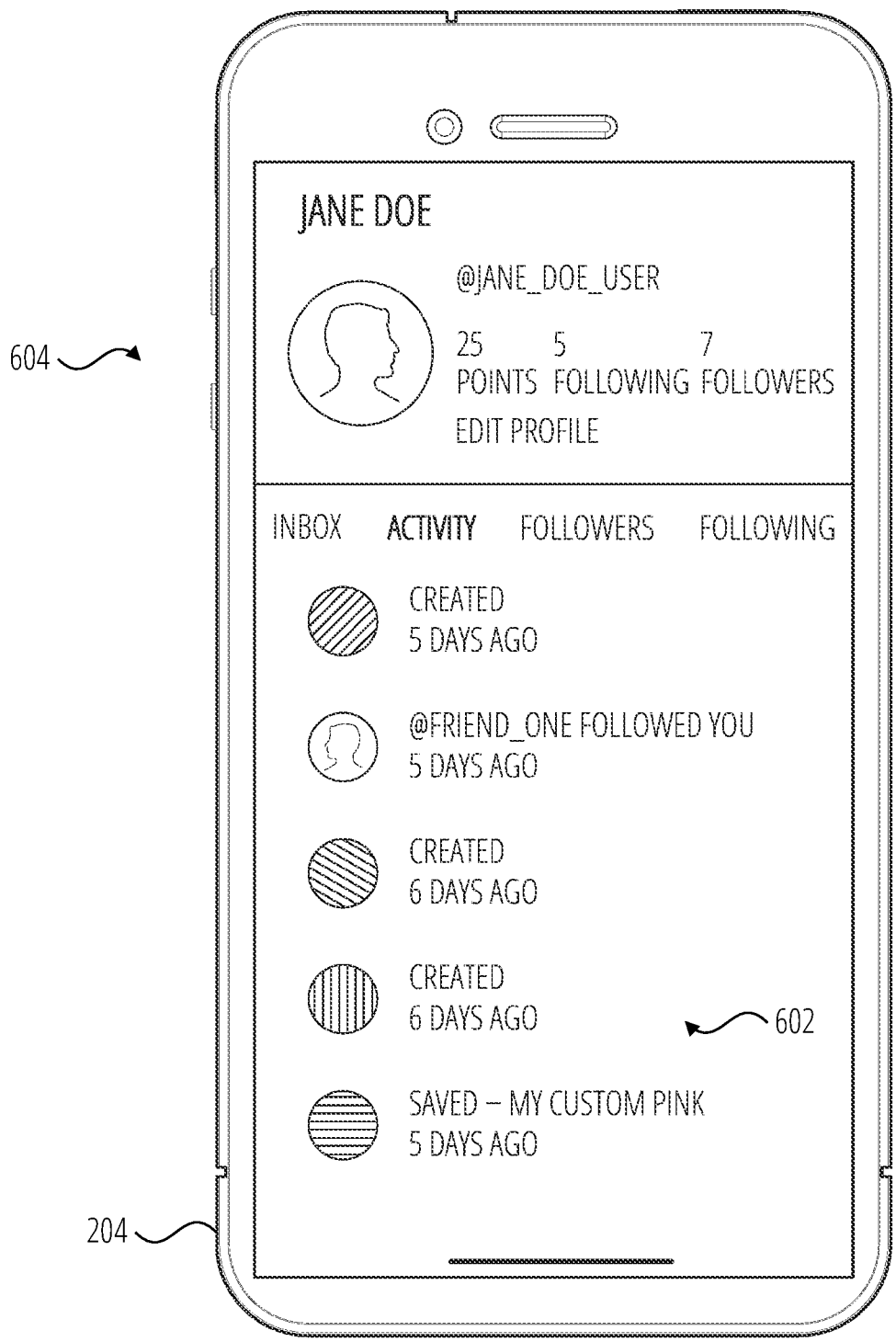
FIG. 6 is an illustration of a non-limiting example embodiment of a user interface generated by the user interface engine of a mobile computing device according to various aspects of the present disclosure.

FIG. 6 is an illustration of a non-limiting example embodiment of a user interface generated by the user interface engine of a mobile computing device according to various aspects of the present disclosure. As shown, the first mobile computing device 204 is presenting a user interface that has an activity list area 602 and a profile information area 604. The activity list area 602 includes one or more activities that were performed by the user associated with the first mobile computing device 204 or relating to the user associated with the first mobile computing device 204 (e.g., colors that were dispensed, colors that were saved, and associations created with friend user accounts). The profile information area 604 shows a user name, a number of associated friend users, a profile picture for the user associated with the first mobile computing device 204, and interface elements for editing the user information.

Returning to FIG. 5B, at block 520, a message collection engine 316 of the color communication computing system 202 receives a plurality of color interest messages, and at block 522, the message collection engine 316 stores the plurality of color interest messages in a message data store 314.

The term "color interest message" is used to refer to various types of messages that indicate a level of interest between an interested user account and a color. One type of color interest message is a message that indicates that a color was dispensed by a product mixing device associated with the interested user account, or at least that a command was transmitted to a product mixing device to dispense the color. Another type of color interest message is a message that indicates that a color was "liked" by the interested user account within a user interface generated by the user interface engine 412. Yet another type of color interest message is a message that indicates that a color was "saved" by the interested user account within a user interface generated by the user interface engine 412. Still another type of color interest message is a message that indicates that a color was tapped, inspected, or otherwise interacted with by the interested user account via the user interface without saving, liking, or dispensing it. The plurality of color interest messages may be received from a plurality of mobile computing devices, and may reflect color interest for a plurality of user accounts (including both friend user accounts and user accounts that are not friend user accounts connected to the user account associated with the first mobile computing device 204) and colors dispensed by a plurality of product mixing devices.

In some embodiments, the color interest message may include information relating to the color and/or the indication of interest. For example, the color interest message may include one or more of a recipe identifier for the color that links to a recipe stored in the color data store 308 of the color communication computing system 202, a description of the color in a color space (e.g., a red-green-blue (RGB) color space), identifiers of one or more color component products used to dispense the color, a name for the color (which may be as of a particular timestamp), a timestamp for the color interest message, an identifier of a collection associated with the color, a type of occasion for the color (e.g., work, dinner, clubbing, etc.), a geographic location for the color, and a time of day for the color (e.g., daytime, nighttime, day-to-night, etc.).

At block 524, the user interface engine 412 of the first mobile computing device 204 transmits a trend request message to the color communication computing system 202, and at block 526, a trend determination engine 318 of the color communication computing system 202 determines one or more relevant colors based on the color interest messages stored in the message data store 314.

How the one or more relevant colors are determined may be based on a type of trend indicated by the trend request message. For example, the trend request message may indicate that a global trend is desired, in which case the trend determination engine 318 may consider all of the color interest messages in the message data store 314. As another example, the trend request message may indicate that a trend among friends is desired, in which case the trend determination engine 318 may limit its consideration to color interest messages in the message data store 314 that are associated with friend user accounts being followed by the requesting user account (i.e., the user account associated with the first mobile computing device 204). As yet another example, the trend request message may indicate that a trend for a particular situation such as a geographic region, time of day, type of occasion, or other type of situation is desired, in which case the trend determination engine 318 may limit its consideration to color interest messages for the desired situation. As still another example, the trend request message may indicate that a trend for dispensed products is desired, in which case the trend determination engine 318 may limit its consideration to color interest messages that indicate that a color was dispensed instead of just saved or liked.

Once a set of relevant color interest messages are determined, the trend determination engine 318 may determine the relevant colors using any suitable technique. In some embodiments, the trend determination engine 318 may identify the most frequently referenced colors in the color interest messages as the relevant colors. In some embodiments, the trend determination engine 318 may identify the most frequently dispensed colors in the color interest messages as the relevant colors. In some embodiments, the trend determination engine 318 may identify the most frequently referenced colors in color interest messages associated with popular user accounts (e.g., user accounts with high numbers of followers) as the relevant colors. In some embodiments, the trend determination engine 318 may calculate a score for each color interest message that can be used to combine multiple characteristics (e.g., popularity of the associated user account, intensity of the interest (e.g., ranking dispensing as more intense than saving, and saving as more intense than liking), whether the associated user account is a friend user account of the user account associated with the first mobile computing device 204, etc.), and may identify the colors with the highest total scores as the relevant colors.

At block 528, the trend determination engine 318 filters the one or more relevant colors based on the identities of the color component products stored in the user data store 312. In some embodiments, the trend determination engine 318 may determine whether color component products used to create the color match the color component products stored in the user data store 312 (i.e., the color component products carried in the cartridges installed in the first product mixing device 108), and may exclude colors for which the color component products do not match. In some embodiments, if the color component products do not match, the trend determination engine 318 may determine whether an alternate recipe may be used to recreate the color using the installed color component products in the first product mixing device 210, and may only exclude the color if no alternate recipe is available.

In some embodiments, all of the one or more relevant colors may be transmitted to the first mobile computing device 204, and the filtering may be performed by the first mobile computing device 204 to avoid presenting colors that cannot be dispensed by the product mixing device 108. In some embodiments, if the trend determination engine 318 determines that one or more relevant colors would be filtered out because they cannot be reproduced using the color component products of the cartridges installed in the first product mixing device 108, the trend determination engine 318 may transmit a message to the first mobile computing device 204 to indicate how cartridges having the matching color component products may be obtained (e.g., information for ordering the color component products from a retailer, etc.).

At block 530, the trend determination engine 318 transmits the filtered one or more relevant colors to the first mobile computing device 204.

The method 500 then proceeds to another continuation terminal ("terminal B"). From terminal B (FIG. 5C), the method 500 proceeds to block 532, where the user interface engine 412 of the first mobile computing device 204 presents the filtered one or more relevant colors. Any suitable technique for presenting the filtered one or more relevant colors may be used, including but not limited to presenting a list of colors presenting a list of color names, and presenting tiles having the one or more relevant colors.

Figure 7:
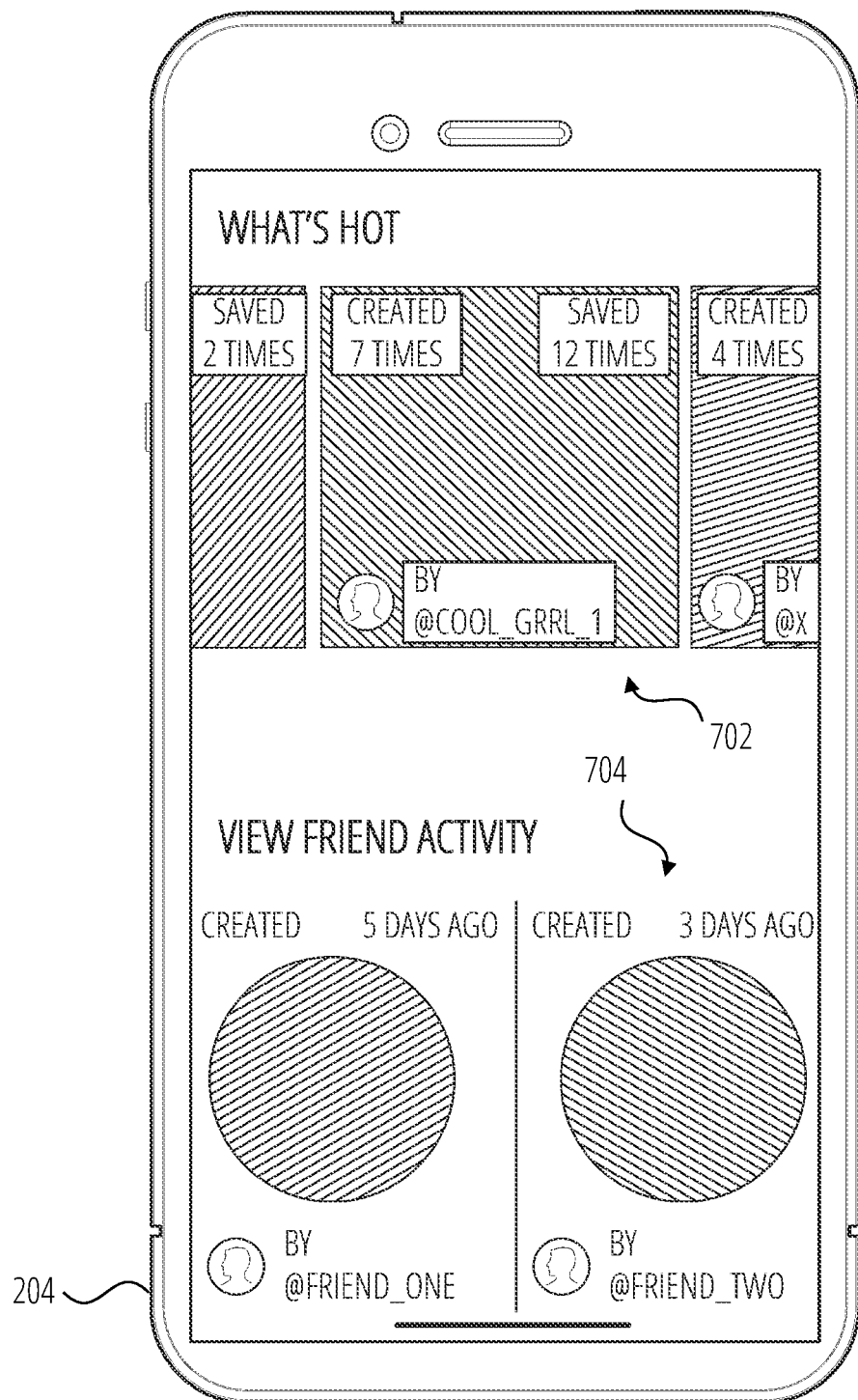
FIG. 7 illustrates a non-limiting example embodiment of a presentation of one or more relevant colors according to various aspects of the present disclosure.

FIG. 7 illustrates a non-limiting example embodiment of a presentation of one or more relevant colors according to various aspects of the present disclosure. In FIG. 7, a global trend area 702 and a friend activity area 704 are shown.

The global trend area 702 shows tiles of a plurality of relevant colors that were determined by the trend determination engine 318 to be trending based on the color interest messages in the message data store 314. Each tile includes a representation of the color itself, along with a profile picture of a user account associated with the color, a count of times the color has been dispensed (as indicated by the color interest messages), and a count of times the color has been saved (as indicated by the color interest messages).

The friend activity area 704 shows similar information, but for friend user accounts associated with the user account of the first mobile computing device 204. In some embodiments, the relevant colors for the global trend area 702 and the friend activity area 704 may be retrieved by the user interface engine 412 in separate queries to the trend determination engine 318. In some embodiments, the colors for the friend activity area 704 may be extracted from the relevant colors returned in a global query and presented in the global trend area 702.

Figure 8:
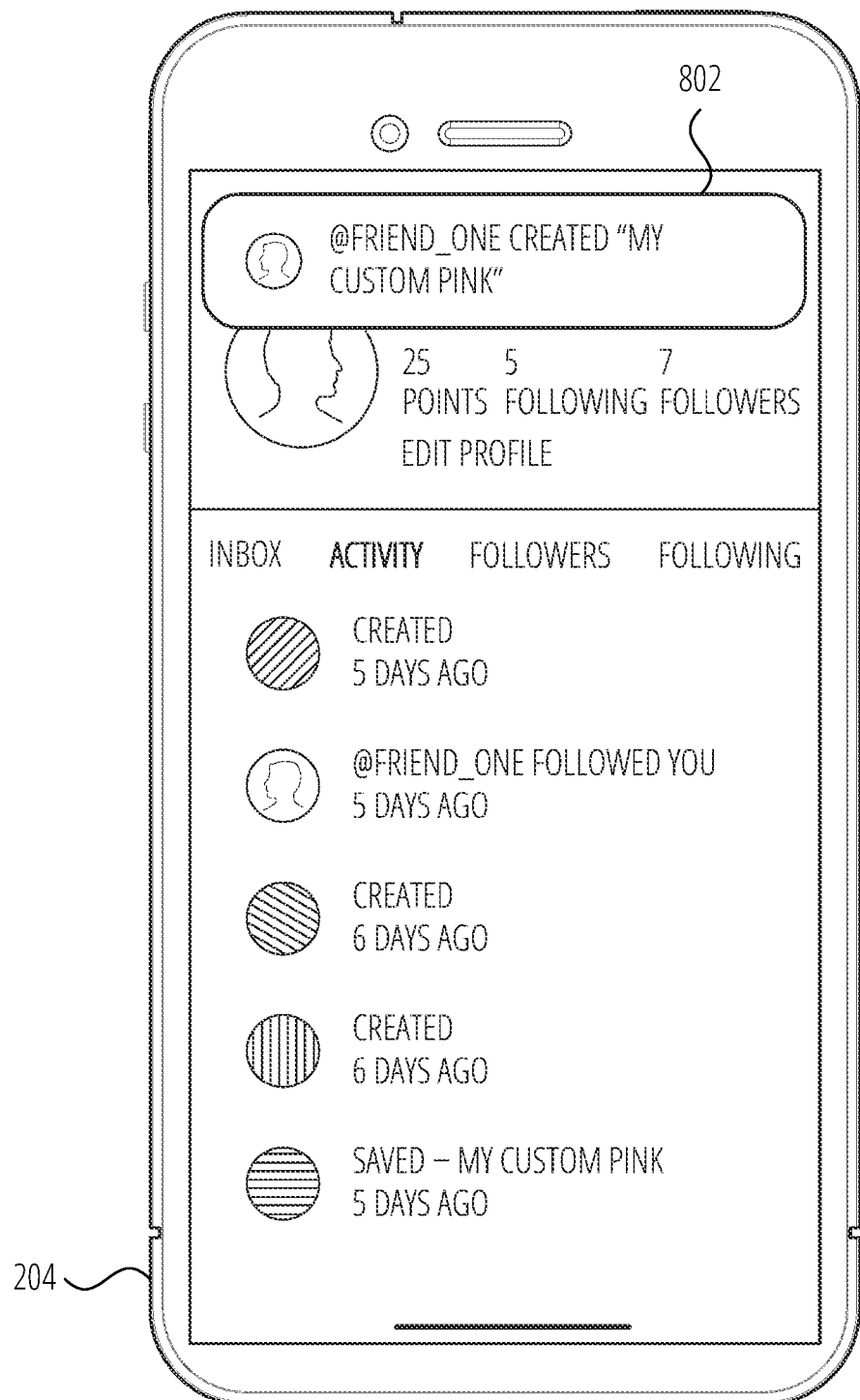
FIG. 8 illustrates a non-limiting example embodiment of a push presentation of color activity information according to various aspects of the present disclosure.

In some embodiments, a more active technique may be used to transmit activity information to the first mobile computing device 204. FIG. 8 illustrates a non-limiting example embodiment of a push presentation of color activity information according to various aspects of the present disclosure. In FIG. 8, an activity push notification 802 is presented at a top of the user interface presented by the first mobile computing device 204. Information for generating the activity push notification 802 may be transmitted to the first mobile computing device 204 by the color communication computing system 202 using an application-directed SMS message, an Apple Push Notification Service message, or any other suitable type of push notification. The activity push notification 802 may itself provide an indication of the color, may provide a deeplink to a portion of the user interface that presents the color, or may provide any other relevant information.

Returning to FIG. 5C, at block 534, the user interface engine 412 receives an input indicating a command to dispense a color from the filtered one or more relevant colors. Any suitable technique for inputting the command in the user interface may be used, including but not limited to a tap, a long tap, a double tap, a tap-and-drag, or any other appropriate input technique.

In some embodiments, the color information included with the relevant colors includes an identifier of the color, but not the recipe for the color, and so the user interface engine 412 transmits a request to the color communication computing system 202 in order to retrieve the recipe. This can help improve the reliability of the activity tracking provided by the color communication computing system 202, in that in these embodiments, the first mobile computing device 204 has to contact the color communication computing system 202 to retrieve the recipe, thus allowing the color communication computing system 202 the opportunity to record the request. This can also help improve the security of the system 200, in that recipe information is not shared with the first mobile computing device 204 until a product having the color is ready to be dispensed, and recipe information can be provided only to authorized devices.

Accordingly, at block 536, the user interface engine 412 transmits a request to the color communication computing system 202 for a recipe for the color. At block 538, the message collection engine 316 of the color communication computing system 202 stores the request for the recipe as a color interest message in the message data store 314, and at block 540, the message collection engine 316 retrieves the recipe from a color data store 308 and transmits the recipe to the first mobile computing device 204.

At block 542, the user interface engine 412 of the first mobile computing device 204 transmits a command to the first product mixing device 108 to dispense the color component products according to the recipe, and at block 544, the first product mixing device 108 dispenses the color component products according to the recipe.

The method 500 then proceeds to an end block and terminates.

Figure 9:
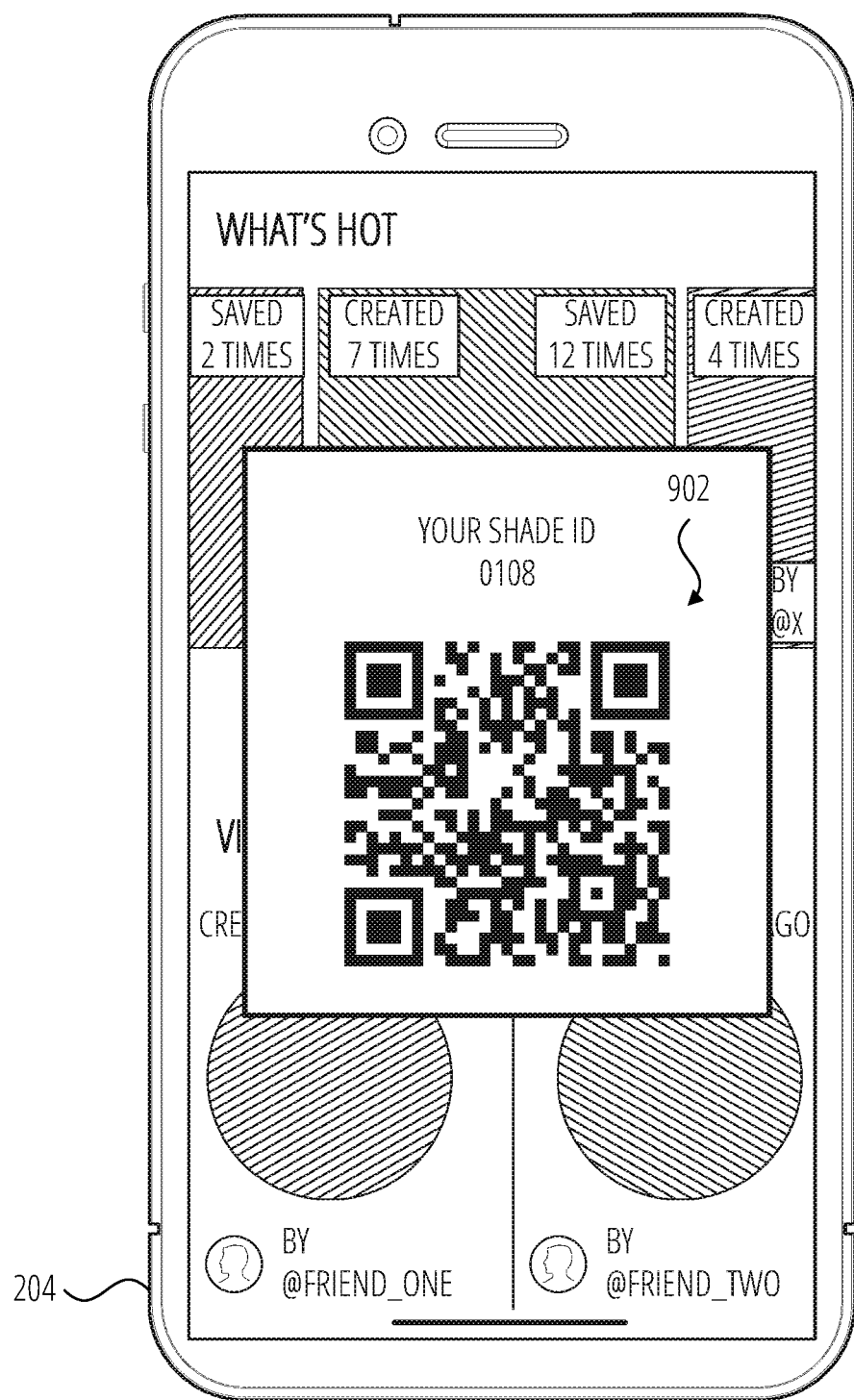
FIG. 9 illustrates a non-limiting example embodiment of a presentation of a color identifier according to various aspects of the present disclosure.

In some embodiments, instead of directly transmitting the command to dispense the product having the color to the first product mixing device 210, the user interface engine 412 may cause an identifier of the color to be presented, such that another device can be used to retrieve the recipe for the color from the color communication computing system 202 for dispensing. FIG. 9 illustrates a non-limiting example embodiment of a presentation of a color identifier according to various aspects of the present disclosure. As shown, instead of transmitting the command directly to the first product mixing device 210, the user interface presents a color identifier 902 in both a human-readable format and a scannable format (e.g., a QR code). The color identifier 902 may then be provided to another device (e.g., second mobile computing device 208) to retrieve the recipe from the color communication computing system 202 and have another product mixing device (e.g., second product mixing device 212) dispense the product having the color. This embodiment may be particularly useful for a user who has a first mobile computing device 204 but does not own a first product mixing device 210, and who may visit a retail location that has a second mobile computing device 208 and a second product mixing device 212 available for public use.

In addition to enabling the highly accurate recreation of customized colors that are trending amongst a group of users, the color communication computing system 202 also enables the highly accurate recreation of specific customized colors on demand. With this functionality, the creation of specific customized colors can be synchronized to coincide with a presentation that uses the customized colors. For example, a presenting user may record a video or produce a live stream that relates to using a specific customized color, and the color communication computing system 202 may allow one or more viewing users to synchronize their product mixing device to generate the specific customized color along with the recorded video or live stream.

Figure 10A:
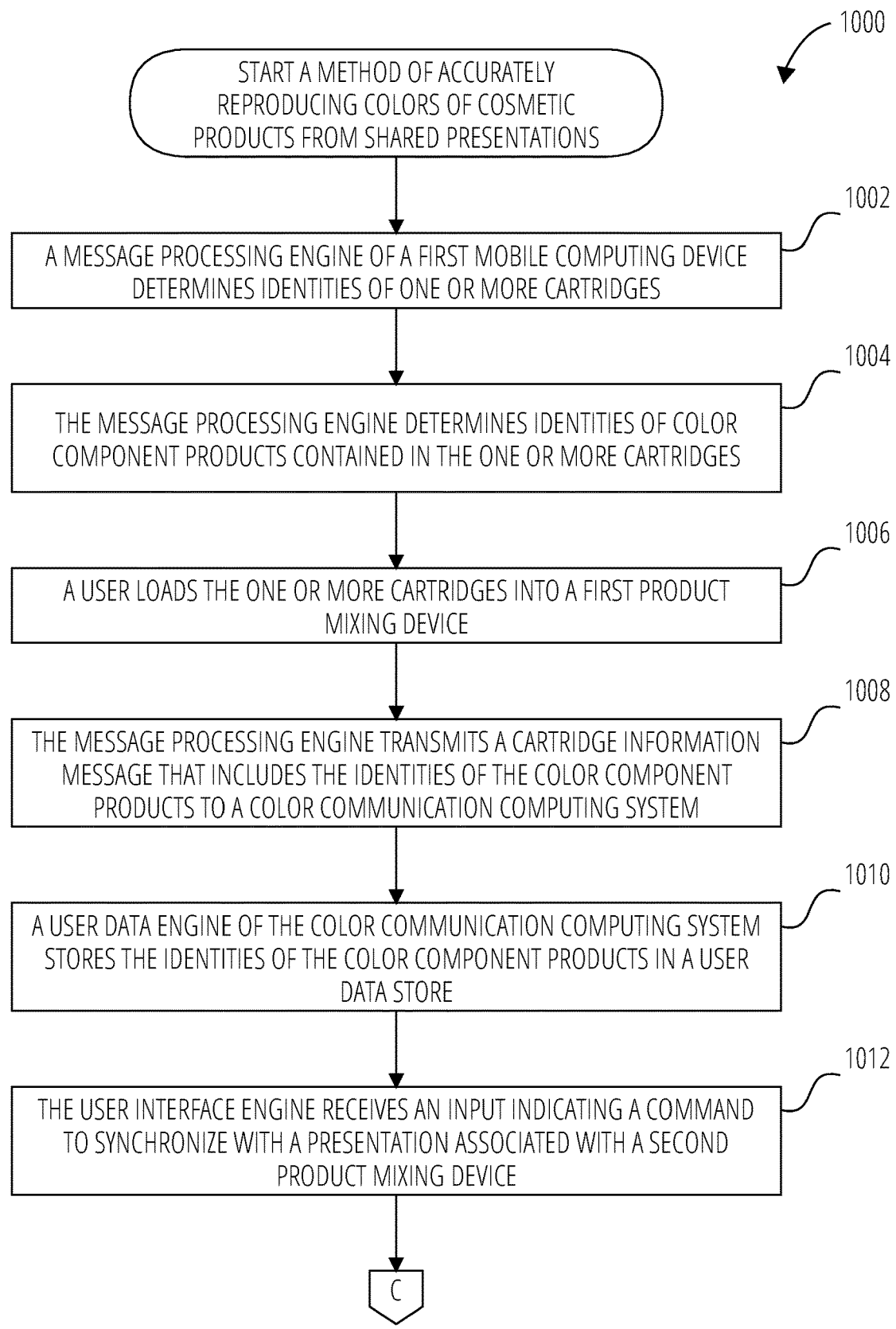
FIG. 10A-FIG. 10C are a flowchart that illustrates a non-limiting example embodiment of a method of accurately reproducing colors of cosmetic products from shared presentations according to various aspects of the present disclosure.
Figure 10B:
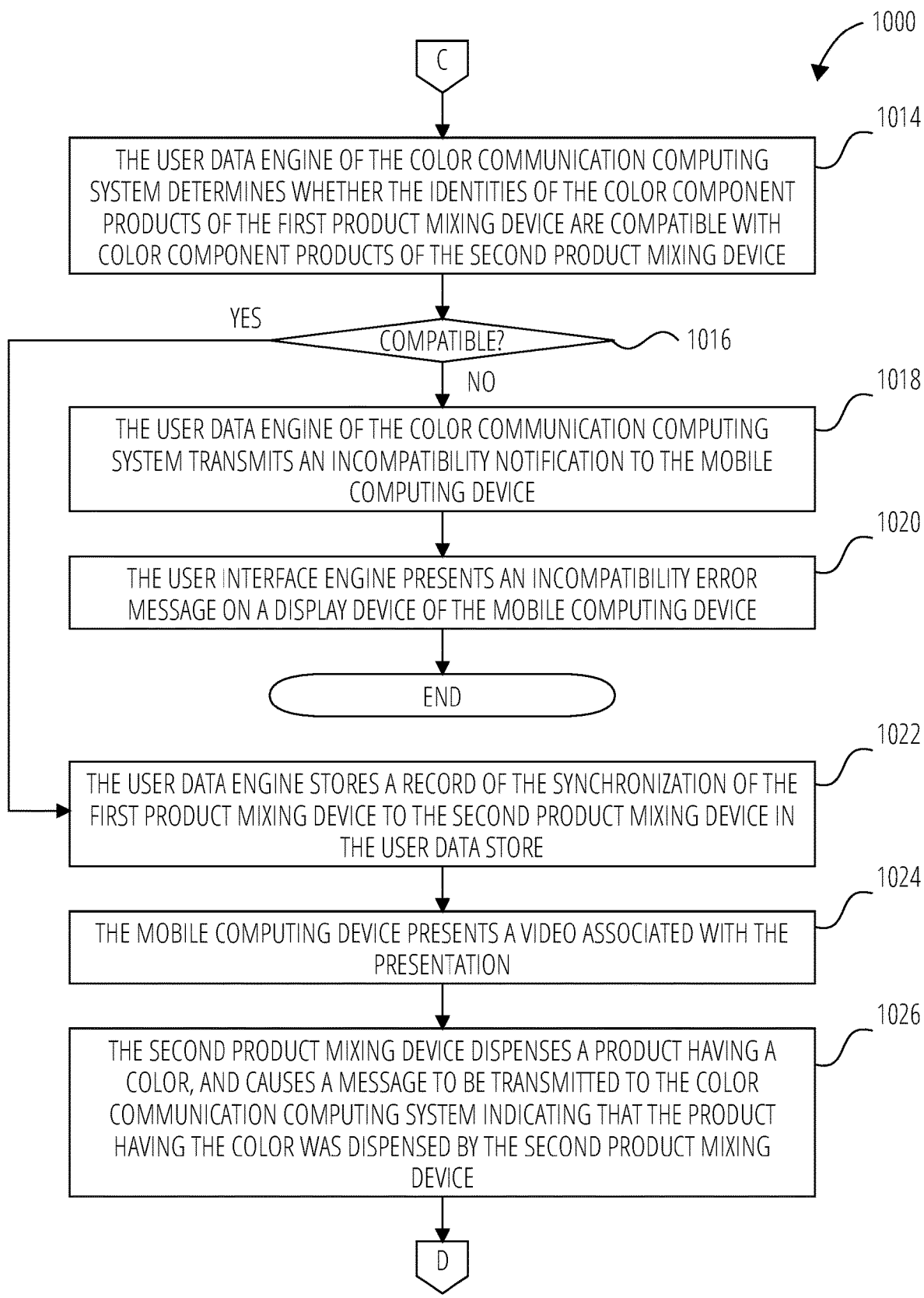
Figure 10C:
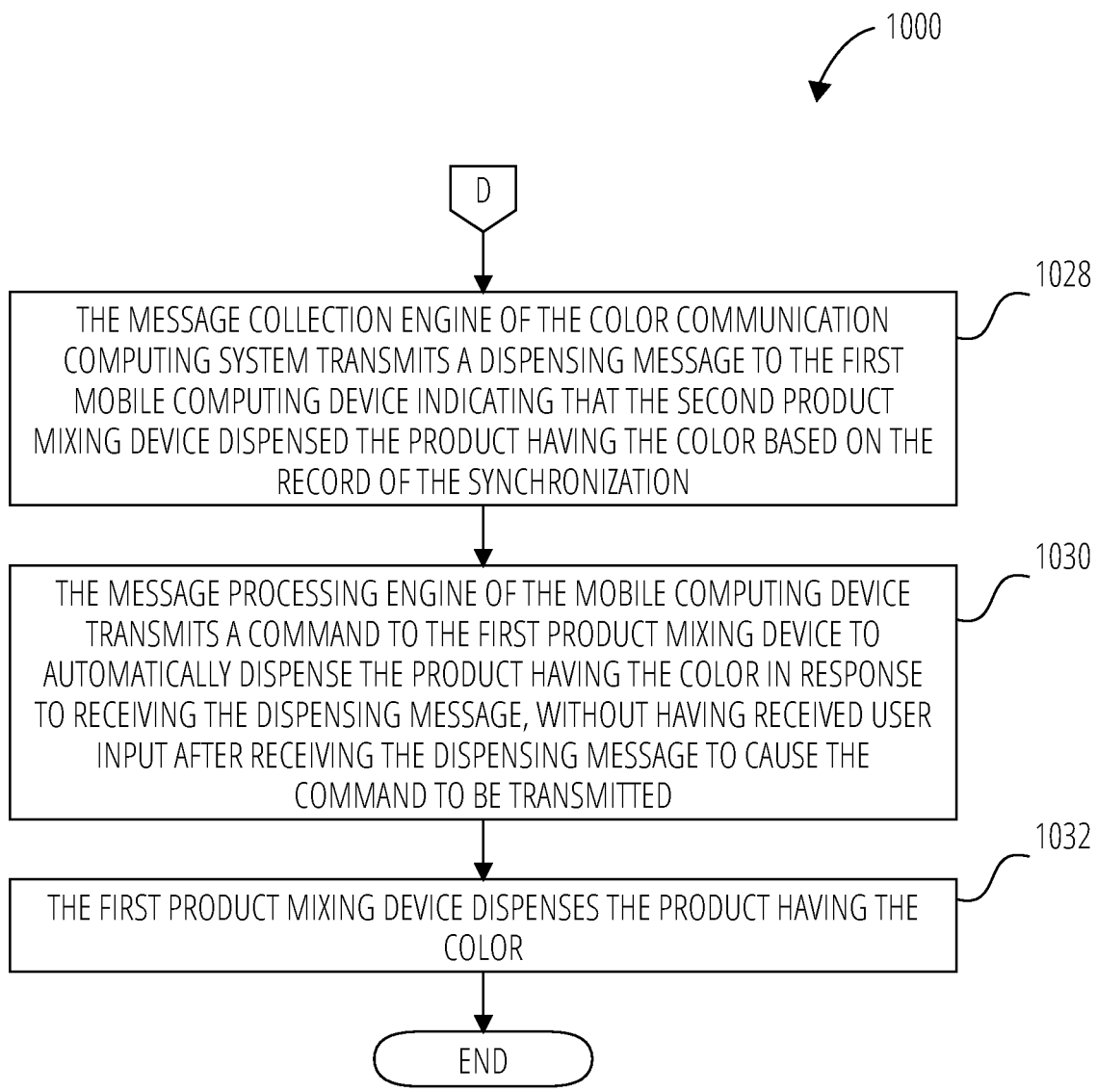

FIG. 10A-FIG. 10C are a flowchart that illustrates a non-limiting example embodiment of a method of accurately reproducing colors of cosmetic products from shared presentations according to various aspects of the present disclosure. In the method 1000, a notification that a second product mixing device 212 used by a presenter is dispensing a product having a color is transmitted to a first mobile computing device 204 associated with a first product mixing device 210, allowing the first product mixing device 210 to operate in a synchronized manner with the second product mixing device 212 and thereby allowing a user of the first product mixing device 210 to follow along with the presentation with a highly accurate reproduction of the color used in the presentation.

From a start block, the method 1000 proceeds to block 1002, where a first product mixing device 210 is loaded with one or more cartridges 112a-112c, wherein each cartridge includes a color component product. At block 1004, the first product mixing device 210 interrogates the one or more cartridges 112a-112c to determine identities of the color component products. At block 1006, the first product mixing device 210 transmits a cartridge information message to a first mobile computing device 204, wherein the cartridge information message includes the identities of the color component products. At block 1008, the message processing engine 410 transmits the cartridge information message to a color communication computing system 202. At block 1010, a user data engine 310 of the color communication computing system 202 stores the identities of the color component products in a user data store 312. The actions of the method 1000 from block 1002 to block 1010 are the same as those of method 500 from block 502 to block 510, and so are not described again here for the sake of brevity. Further, in some embodiments, similar actions to determine and transmit indications to the color communication computing system 202 of the color component products installed in the second product mixing device 212 to be used in the presentation may also occur.

At block 1012, the user interface engine 412 receives an input indicating a command to synchronize with a presentation associated with a second product mixing device 108. In some embodiments, the user interface engine 412 may present a list of presentations that can be synchronized, and the input may be received via the presented list. In some embodiments, the user interface engine 412 may present a notification that a presentation is beginning, and interacting with the notification may constitute the input indicating the command to synchronize.

The method 1000 then proceeds to a continuation terminal ("terminal C"). From terminal C (FIG. 10B), the method 1000 proceeds to block 1014, where the user data engine 310 of the color communication computing system 202 determines whether the identities of the color component products of the first product mixing device 210 are compatible with color component products of the second product mixing device 212. As discussed above with respect to filtering relevant colors in block 528, the user data engine 310 may check whether the same color component products are installed in the first product mixing device 210 and the second product mixing device 212, or, if different, may check whether alternate recipes may be used with the color component products installed in the first product mixing device 210 to generate relevant colors.

The method 1000 then proceeds to decision block 1016. If the determination at block 1014 was that the color component products of the first product mixing device 210 are not compatible with the color component products of the second product mixing device 212, then the result of decision block 1016 is NO, and the method 1000 proceeds to block 1018. At block 1018, the user data engine 310 of the color communication computing system 202 transmits an incompatibility notification to the first mobile computing device 204, and at block 1020, the user interface engine 412 presents an incompatibility error message on a display device 414 of the first mobile computing device 204. Any suitable type of error message may be presented, including but not limited to a warning message, an instruction to change the cartridges to compatible cartridges before continuing, and so on. The method 1000 then proceeds to an end block and terminates, and may restart from the beginning upon detecting that the cartridges are replaced in the first product mixing device 210.

Returning to decision block 1016, if the determination of block 1014 was that the color component products of the first product mixing device 210 are compatible with the color component products of the second product mixing device 212, then the result of decision block 1016 is YES, and the method 1000 proceeds to block 1022.

At block 1022, the user data engine 310 stores a record of the synchronization of the first product mixing device 210 to the second product mixing device 212 in the user data store 312. In some embodiments, the record may identify the user account associated with the first mobile computing device 204. In some embodiments, the record may include a network address or include other contact information that may be used to transmit push notifications or other messages to the first mobile computing device 204.

At block 1024, the first mobile computing device 204 presents a video associated with the presentation. In some embodiments, the video may be a recorded video. In some embodiments, the video may be a live stream. In some embodiments, the video may be presented within the user interface generated by the user interface engine 412. In some embodiments, the video may be presented by another application (e.g., a video streaming application such as YouTube, Tik Tok, Instagram, etc.) while the message processing engine 410 remains available in the background to process incoming messages from the color communication computing system 202.

At block 1026, the second product mixing device 212 dispenses a product having a color, and causes a message to be transmitted to the color communication computing system 202 indicating that the product having the color was dispensed by the second product mixing device 212. In some embodiments, the second product mixing device 212 transmits the message to the second mobile computing device 208, and the second mobile computing device 208 in turn transmits the message to the color communication computing system 202. In some embodiments, the second mobile computing device 208 may transmit a dispensing command to the second product mixing device 212 and may then transmit the message to the color communication computing system 202 without receiving another communication from the second product mixing device 212.

The method 1000 then proceeds to another continuation terminal ("terminal D"). From terminal D (FIG. 10C), the method 1000 proceeds to block 1028, where the message collection engine 316 of the color communication computing system 202 transmits a dispensing message to the first mobile computing device 204 indicating that the second product mixing device 212 dispensed the product having the color based on the record of the synchronization. In some embodiments, the message collection engine 316 may review the records of synchronization stored in the user data store 312 and may transmit the dispensing messages to all of the relevant devices, including but not limited to the first mobile computing device 204.

At block 1030, the message processing engine 410 of the first mobile computing device 204 transmits a command to the first product mixing device 210 to automatically dispense the product having the color in response to receiving the dispensing message, without having received user input after receiving the dispensing message to cause the command to be transmitted, and at block 1032, the first product mixing device 210 dispenses the product having the color. In some embodiments, confirmation to dispense the product having the color may be provided to the first product mixing device 210 via the button 102, even if no user input is provided to the first mobile computing device 204. In other embodiments, no confirmation to dispense the product is received after receiving the dispensing message on either the first mobile computing device 204 or the first product mixing device 210 before automatically dispensing the product having the color.

In some embodiments, wherein the video is a live stream, the color communication computing system 202 may transmit the dispensing messages to the synchronized mobile computing devices in real time. That is, the time between the message indicating that the product was dispensed being transmitted at block 1026 and the dispensing message being received by the first mobile computing device 204 is short enough such that the dispensing message appears to be received by the first mobile computing device 204 in coordination with the dispensing of the product by the second product mixing device 212, which may be visible in the live stream. The effect of this real time communication is that the first product mixing device 210 and the second product mixing device 212 may concurrently dispense the product having the color, which allows the user of the first product mixing device 210 and first mobile computing device 204 to follow along with the live stream and use the product having the color as directed by the live stream.

In some embodiments, wherein the video is a recording, the dispensing messages may include time stamps, time codes, or other indications of points in the recorded video when the product should be dispensed. Accordingly, the first mobile computing device 204 may receive the dispensing messages and wait until appropriate times during playback of the recorded video to transmit the commands to the first product mixing device 210.

The method 1000 then proceeds to an end block and terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system, comprising:
    a plurality of product mixing devices;
    a color communication computing system; and
    a mobile computing device communicatively coupled to a first product mixing device of the plurality of product mixing devices and communicatively coupled to the color communication computing system;
    wherein the mobile computing device includes a non-transitory computer-readable medium having computer-executable instructions stored thereon that, in response to execution by at least one processor of the mobile computing device, cause the mobile computing device to perform actions comprising:
        receiving a message from the color communication computing system indicating a product having a first color that was dispensed by a second product mixing device of the plurality of product mixing devices; and
        causing, by the mobile computing device, the first color to be presented.

2. The system of claim 1, wherein causing the first color to be presented includes transmitting a command to the first product mixing device to dispense the product having the first color.

3. The system of claim 2, wherein transmitting the command to the first product mixing device includes automatically transmitting the command to the first product mixing device without having received user input after receiving the message from the color communication computing system to cause the command to be transmitted.

4. The system of claim 3, wherein the actions further comprise:
    presenting, by the mobile computing device, a live video that includes the second product mixing device performing actions for dispensing the product having the first color that caused the message from the color communication computing system to be transmitted.

5. The system of claim 1, wherein causing the first color to be presented includes presenting, by the mobile computing device, a notification on a display device of the mobile computing device that indicates that the product having the first color was dispensed.

6. The system of claim 1, wherein causing the first color to be presented includes presenting, by the mobile computing device, a scannable identifier usable to retrieve a recipe for the product having the first color from the color communication computing system.

7. The system of claim 1, wherein the actions further comprise:
    receiving, by the mobile computing device from the first product mixing device, a message indicating that a product having a second color has been dispensed by the first product mixing device; and
    transmitting, by the mobile computing device to the color communication computing system, the message.

8. The system of claim 1, wherein the actions further comprise:
    receiving, by the mobile computing device, trend information from the color communication computing system, wherein the trend information indicates one or more colors of products tracked by the color communication computing system; and
    presenting, by the mobile computing device, the trend information on a display device of the mobile computing device.

9. The system of claim 8, wherein the actions further comprise receiving, by the mobile computing device from the first product mixing device, information regarding one or more color component products within one or more cartridges installed in the first product mixing device;
    wherein presenting the trend information includes filtering the trend information to exclude colors of products that cannot be dispensed using the one or more cartridges installed in the first product mixing device.

10. The system of claim 1, wherein the product is lipstick, lip gloss, or lip stain.

11. A method, comprising:
    receiving, by a mobile computing device that is communicatively coupled to a first product mixing device, a message from a color communication computing system indicating a product having a first color that was dispensed by a second product mixing device; and
    causing, by the mobile computing device, the first color to be presented.

12. The method of claim 11, wherein causing the first color to be presented includes transmitting a command to the first product mixing device to dispense the product having the first color.

13. The method of claim 12, wherein transmitting the command to the first product mixing device includes automatically transmitting the command to the first product mixing device without having received user input after receiving the message from the color communication computing system to cause the command to be transmitted.

14. The method of claim 13, further comprising:
presenting, by the mobile computing device, a live video that includes the second product mixing device performing actions for dispensing the product having the first color that caused the message from the color communication computing system to be transmitted.

15. The method of claim 11, wherein causing the first color to be presented includes presenting, by the mobile computing device, a notification on a display device of the mobile computing device that indicates that the product having the first color was dispensed.

16. The method of claim 11, wherein causing the first color to be presented includes presenting, by the mobile computing device, a scannable identifier usable to retrieve a recipe for the product having the first color from the color communication computing system.

17. The method of claim 11, further comprising:
receiving, by the mobile computing device from the first product mixing device, a message indicating that a product having a second color has been dispensed by the first product mixing device; and
transmitting, by the mobile computing device to the color communication computing system, the message.

18. The method of claim 11, further comprising:
receiving, by the mobile computing device, trend information from the color communication computing system, wherein the trend information indicates one or more colors of products tracked by the color communication computing system; and
presenting, by the mobile computing device, the trend information on a display device of the mobile computing device.

19. The method of claim 18, further comprising receiving, by the mobile computing device from the first product mixing device, information regarding one or more color component products within one or more cartridges installed in the first product mixing device;
wherein presenting the trend information includes filtering the trend information to exclude colors of products that cannot be dispensed using the one or more cartridges installed in the first product mixing device.

20. The method of claim 11, wherein the product is lipstick, lip gloss, or lip stain.

* * * * *